United States Patent [19]
Suzuki

[11] Patent Number: 4,898,351
[45] Date of Patent: Feb. 6, 1990

[54] MECHANISM FOR SUPPORTING A LONG FLEXIBLE ELEMENT

[75] Inventor: Norio Suzuki, Tokyo, Japan

[73] Assignee: Juki Corporation, Chofu, Japan

[21] Appl. No.: 289,556

[22] Filed: Dec. 22, 1988

[30] Foreign Application Priority Data

Dec. 25, 1987 [JP] Japan .................................. 62-329315

[51] Int. Cl.⁴ ................................................ F16L 3/00
[52] U.S. Cl. ....................................... 248/51; 400/120; 400/124
[58] Field of Search ........................ 248/51, 49, 65, 66, 248/53; 400/120, 124, 320; 346/76 R, 76 L

[56] References Cited

U.S. PATENT DOCUMENTS

| 3,098,349 | 7/1963 | Waninger | 248/49 X |
| 3,503,578 | 3/1970 | Kurlandsky | 248/51 |
| 4,203,680 | 5/1980 | Mitrovich | 400/320 X |
| 4,459,050 | 7/1984 | Goldberg et al. | 400/124 X |
| 4,672,805 | 6/1987 | Moritz | 248/49 X |
| 4,746,237 | 5/1988 | Takeda | 400/320 |
| 4,746,766 | 5/1988 | Soulard | 400/320 |

FOREIGN PATENT DOCUMENTS 61-14703 4/1986 Japan .

Primary Examiner—Ramon O. Ramirez
Attorney, Agent, or Firm—Morgan & Finnegan

[57] ABSTRACT

A mechanism for supporting a long flexible element is described, including a section having a thin flexible tape. The flexible tape section is curved slightly to stiffen the tape. Preferably, the tape is made of spring-steel and is placed along the outer or inner surface of the long flexible element such that the long flexible element is guided and supported by the tape as the element travels and turns back without forming an irregularly expanded loop at the turning portion.

16 Claims, 3 Drawing Sheets

MECHANISM FOR SUPPORTING A LONG FLEXIBLE ELEMENT

BACKGROUND OF THE INVENTION

The invention relates to a mechanism for supporting a long flexible element. More particularly, the invention pertains to a mechanism for supporting a flat cable extended from a print head which reciprocally conducts horizontal motion for printing operations in a printer or typewriter.

Referring to FIG. 6 and FIG. 7, one conventional way of supporting a flat cable used for a typical printer will be explained. A printer head 11 is installed on a carriage 14 which reciprocates horizontally along a guide 13. The guide 13 runs between both frames 12 such that the print head 11 travels with the carriage 14 and the printing is conducted. A ribbon cassette 15 is positioned adjacent to the print head 11.

A flat cable 16 is extended from the print head 11 to control the print head 11. The flat cable 16 is placed at the backside of the print head 11 and is drawn far enough to allow the reciprocal motion of the print head 11 and is then turned back to the print head 11. The end of the flat cable 16 is connected to an electric panel (not shown) passing through the frame 12. A cable support 17 is extended between frames 12 to support the hanging-down of the flat cable 16.

As shown in FIG. 6, as the print head 11 moves rightward, the turning point of the flat cable 16 occupies various positions such as those shown at 16, 16a, 16b.

Under the aforementioned mechanism of the conventional printer, the turning points shown as 16, 16a, 16b in FIG. 6 tend to expand as shown at 16' and 16a', in FIG. 6. As the flat cable expands, it can touch components such as a cover plate 18. Thereby, the flat cable 16 can become worn and its durability can become lowered. To avoid the wearing of the cable, extra spacing needed to be provided between the cover plate 18 and the cable support 17.

Moreover, to avoid the hanging-down of the flat cable 16, the cable support 17 was provided. Thereby, the positional relation between the carriage 14 and the flat cable 16 was restricted. Also, position and sizing of the ribbon shifting members (not shown) and the ribbon cassette 15 were also restricted.

It is therefore an object of the invention to provide a method and apparatus for supporting a long flexible member, such as a print head cable mechanism, which eliminates the above-mentioned deficiencies of the prior art.

SUMMARY OF THE INVENTION

These and other objects of the invention are met by providing a mechanism for supporting a long flexible member, wherein a support tape, whose transverse section is slightly curved, is provided along an inner or outer side of the flexible member such that the flexible member is supported by the tape. The flexible member may be a flat cable such as one for controlling a printer head. The tape is preferably made of spring-steel The tape may be similar to the steel tape of a conventional tape measure.

BRIEF DESCRIPTION OF THE DRAWINGS

The invention will be described in greater detail below by way of reference to the following drawings, wherein.

DETAILED DESCRIPTION OF THE DRAWINGS

Figure 1:
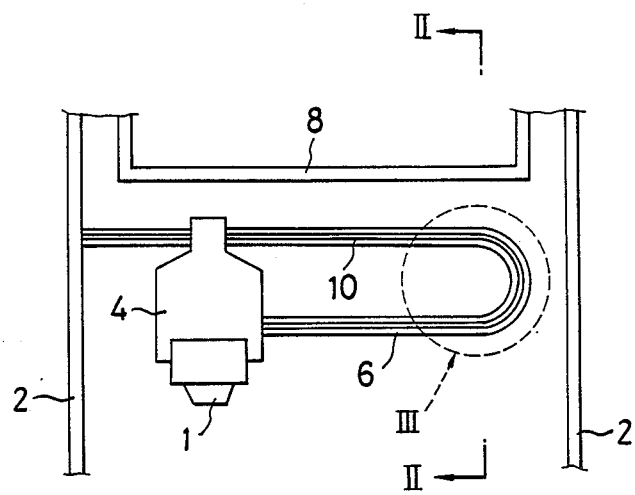
FIG. 1 is a partial front view drawing of a printer, illustrating essential portions thereof related to the present invention.
Figure 2:
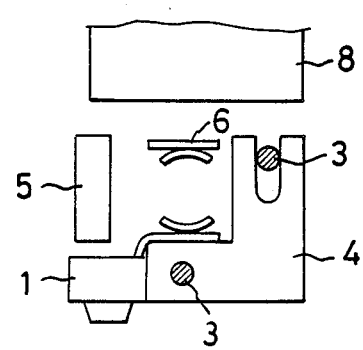
FIG. 2 is a sectional view drawing taken along the line II—II of FIG. 1.

Referring to FIGS. 1–5, preferred embodiments of the present invention will be explained.

A flat cable 6, extended from a print head 1, is placed on a carriage 4, is further extended in the traveling direction of the print head, and is turned back to an electric panel (not shown) located at the outer side of a frame 2. The carriage 4 travels along a guide 3.

Figure 6:
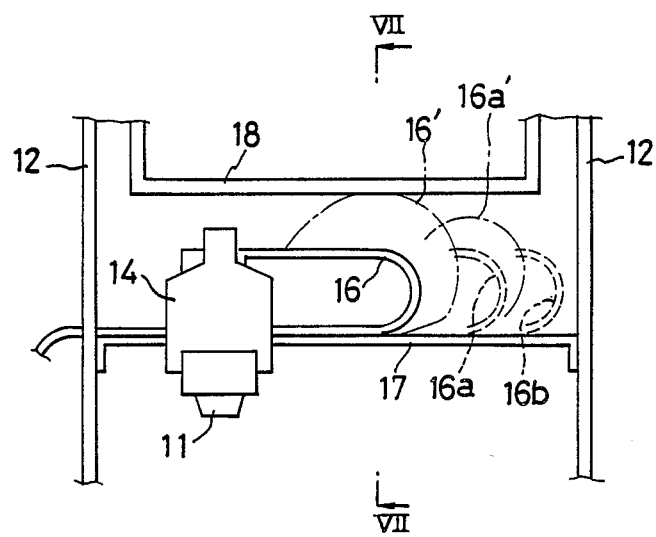
FIG. 6 is a front view drawing of a conventional printer showing parts related to the background of the present invention.

According to the present invention, expanded turning points such as those shown at 16' and 16'a, in FIG. 6 will not occur and hanging-down of the flat cable 6 may also be avoided although a support 7 for the flat cable is not provided.

Figure 3:
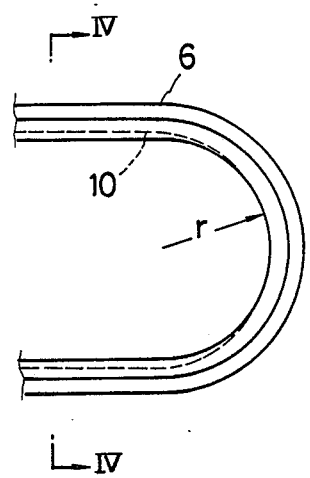
FIG. 3 is a detailed drawing of a portion III of FIG. I.
Figure 4:
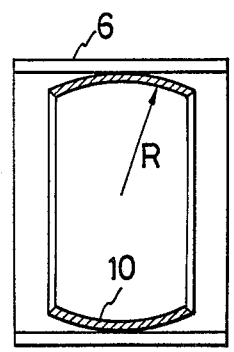
FIG. 4 is a sectional view drawing taken along the line IV—IV of FIG. 3.

Referring to FIG. 4, which is a sectional view drawing taken along the line IV—IV of FIG. 3, a support tape 10 with a slightly curved surface of radius R is illustrated. The support tape 10 is preferably made of a thin spring-steel. One end of the tape 10 is connected to the carriage 4 as shown in FIG. 1. The tape 10 is extended from this connection point such that a predetermined horizontal reciprocal movement of the carriage 4 is allowed. The tape is then turned back with a radius r and is fixed to the frame.

The flat cable 6 may be placed along the outer surface of the support plate 10 with a small clearance therebetween such that the flat cable 6 and the support tape 10 travel without interfering with each other.

Figure 5:
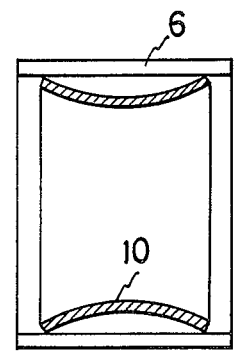
FIG. 5 is a further embodiment illustrating a similar view as to that shown in FIG. 4.

Referring to FIG. 4, the section view of the supporting tape shows that it is outwardly convexed. However, an outwardly concaved tape is also applicable as shown in FIG. 5 The tape itself may be similar to those of conventional tape measures.

For purposes other than those of the instant invention, curved elements per se have been used previously. For example, in the facsimile machine disclosed in Japanese Patent Publication No. 61-14703 (Apr. 19, 1986), a curved belt is used around a roller.

In the embodiments shown herein, the flat cable 6 surrounds the support tape 10 . However, it is possible to place the support tape 10 so that it surrounds the flat cable 6.

When the tape whose section is convexed or concaved with a radius of curvature R is turned back, the radius of turning back r is defined by the R value and the turning back radius r is thereby not expanded and there is no external force except the reciprocal motion of the tape.

Figure 7:
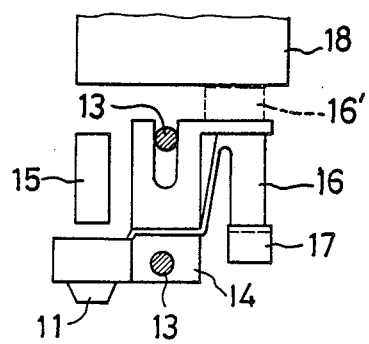
FIG. 7 is a sectional view drawing taken along the line VII—VII of FIG. 6.

According to the present invention, the support tape 10, whose physical nature is defined as aforementioned, is used for supporting a flat cable 6. The turning back portion will not be expanded as had been shown in FIG. 6 and FIG. 7, and thereby spacing under the cover 8 is minimized and the total machine size may be more compactly constructed.

Even though the support tape 10 is very thin, since the section of the support tape 10 is curved as shown in FIG. 4 and FIG. 5, the support tape is stiffened strongly enough to support the flat cable 6. Thereby, the cable support 7, such as shown in FIG. 6, may be eliminated as well as other auxiliary parts related to the cable support 7.

As described above, the present invention is applied in one example for use with flat cable of a printer. However, it should be readily understood that the invention is not limited to such embodiments. The invention may be applied generally for supporting long flexible elements.

Thus, as many apparently widely different embodiments of the invention may be made without departing from the spirit and scope therein, it is to be understood that the invention is not limited to the specific embodiments herein described and should only be defined in accordance with the claims which follow.

I claim:

1. A mechanism for supporting a long flexible cable having at least one end which is attached to a movable member which travels substantially longitudinally and reciprocally, comprising:
   a long tape whose transverse section is curved outwardly or inwardly with constant curvature, said tape being placed along the length of said cable and in contact therewith in a manner supporting said cable and causing said cable to maintain a uniform angle of curvature at its point of turn back substantially throughout the travel of said member.

2. A mechanism for supporting a long flexible cable, as recited in claim 1, in which said tape is made of elastic material.

3. A mechanism for supporting a long flexible cable as recited in claim 1, in which another end of said long flexible cable is fixed and said tape turns back along the turning portion of said long flexible cable.

4. A mechanism for supporting a long flexible cable as recited in claim 2, in which another end of said long flexible cable is fixed and said tape turns back along the turning portion of said long flexible cable.

5. A mechanism for supporting a long flexible cable as recited in claim 1, in which said long flexible cable is a flat cable connected to a print head of a printer.

6. A mechanism for supporting a long flexible cable as recited in claim 2, in which said long flexible cable is a flat cable connected to a print head of a printer.

7. A mechanism for supporting a long flexible cable as recited in claim 3, in which said long flexible cable is a flat cable connected to a print head of a printer.

8. A mechanism for supporting a long flexible cable as recited in claims 4, in which said long flexible cable is a flat cable connected to a print head of a printer.

9. A mechanism for supporting a long flexible flat cable having at least one end which is attached to a movable member which travels substantially longitudinally and reciprocally, comprising:
   a long tape whose transverse section is curved outwardly or inwardly with constant curvature, said tape being placed along the length of said flat cable in contact therewith in a manner supporting said flat cable and causing said cable to maintain a uniform angle of curvature at its point of turn back substantially throughout the travel of said member.

10. A mechanism for supporting a long flexible flat cable, as recited in claim 9, in which said tape is made of elastic material.

11. A mechanism for supporting a long flexible flat cable as recited in claim 9, in which another end of said long flexible flat cable is fixed and said tape turns back along the turning portion of said long flexible flat cable.

12. A mechanism for supporting a long flexible flat cable as recited in claim 10, in which another end of said long flexible flat cable is fixed and said tape turns back along the turning portion of said long flexible flat cable.

13. A mechanism for supporting a long flexible flat cable as recited in claim 9, in which said long flexible flat cable is connected to a print head of a printer.

14. A mechanism for supporting a long flexible flat cable as recited in claim 10, in which said long flexible flat cable is connected to a print head of a printer.

15. A mechanism for supporting a long flexible flat cable as recited in claim 11, in which said long flexible flat cable is connected to a print head of a printer.

16. A mechanism for supporting a long flexible flat cable as recited in claim 12, in which said long flexible flat cable is connected to a print head of a printer.

* * * * *